H. STAUB.
Smut Mill.
No. 4,524.   Patented May 16, 1846.
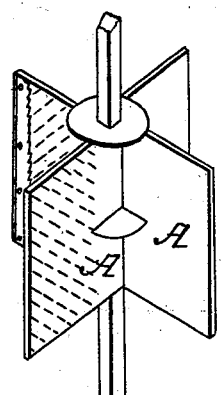
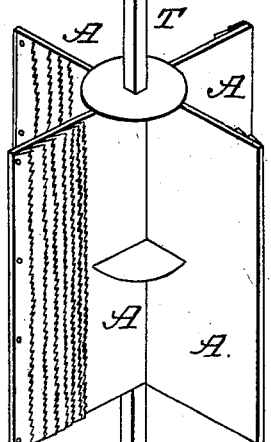
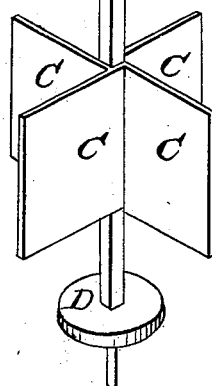
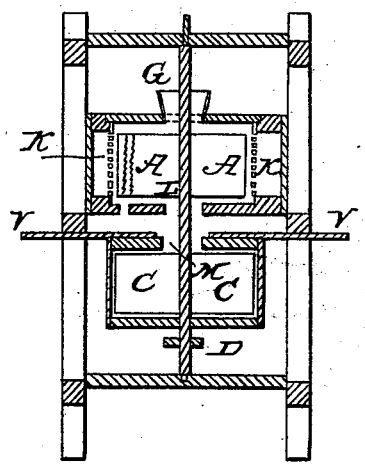
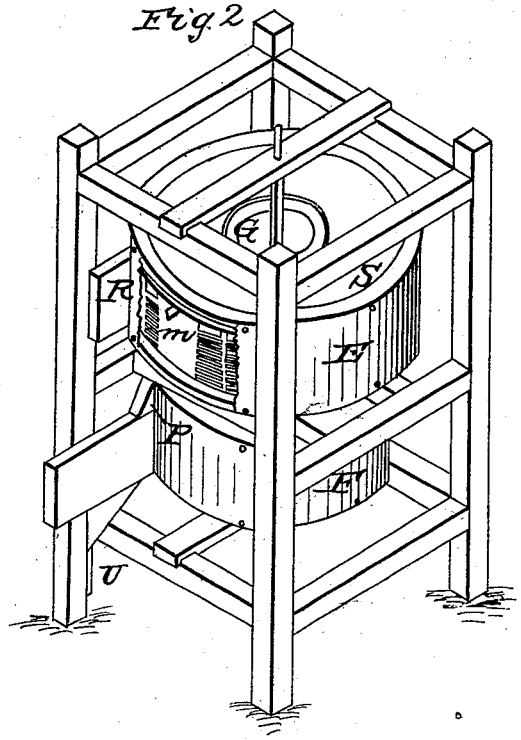

UNITED STATES PATENT OFFICE.

HENRY STAUB, OF MARTINSBURG, VIRGINIA.

SMUT-MACHINE.

Specification of Letters Patent No. 4,524, dated May 16, 1846.

*To all whom it may concern:*

Be it known that I, HENRY STAUB, of Martinsburg, in the county of Berkeley and State of Virginia, have invented a new and Improved Machine for Cleaning Wheat of Smut, Garlic, and other Impurities, Preparatory to its being Ground into Flour; and I do hereby declare the following to be a full and exact description of the same, reference being had to the accompanying drawing, making a part of this specification.

Figure 1, is a perspective elevation of the shaft passing through my machine, with the beating and fanning wings attached thereto. Fig. 2 is a perspective elevation of my machine, a part being removed for the purpose of showing the internal arrangement, and Fig. 3, is a vertical section through the center thereof.

I construct a square frame in any well known or usual manner, of posts and cross pieces. I then secure in the upper portion of the frame, a drum or curb E, and immediately under the drum E, I secure another drum F. The drum E, has a circular screen H, placed within and concentric with it at the distance of a few inches, leaving an annular space K, between them, which is connected with the spout R. The shaft T, passes up through the center of the drums E and F. Upon the shaft T, there are placed four beating wings A, A, which revolve within the screen H, in drum E. The front or beating surfaces of the wings A, are armed with narrow saws, b b placed upon them as follows: The back of the outer saw is placed parallel with the outer end of the wings, with its front or saw edge projecting from the sides of the same at an angle of thirty degrees (more or less). The next saw in succession, is placed parallel with the one on the end of the wings, with its back extending under the front edge thereof, and overlapped by it. The saws are secured by screws, so as to be easily removed when they require sharpening. In this way as many saws may be placed upon the beating wings as may be desired. Six however is as many, as I generally make use of. The distance between the saw edges, gradually diminishes from the outer to the inner end of the wings.

In the drum F, there revolve four wings C, C, attached to the shaft T, which constitute the fan or wind wheel for removing the dust and dirt from the wheat, after it has been broken up by the beaters in drum E.

After the machine is put in rapid motion, the wheat to be cleaned, is admitted to the beating chamber within the cylinder E, through the opening G, in the cover (S,) of the same, surrounding the shaft. The projecting edges of the saws b, b, upon the beating wings A, A, scour the wheat, and break up and pulverize the smut and all other impurities that may be in the wheat. The centrifugal force of the beating wings, aided by the blast of air thrown off laterally from them, forces the pulverized impurities in the wheat through the circular inclosing screen H, into the chamber K, and out through the spout R. The wheat is carried by the beaters into the opening n, in the bottom of the beating chamber—and it passes down the spout P, into the spout Q, which receives the blast from the fan. The blast removes the remaining impurities from the wheat which pass out at the end of the spout Q, and carries the wheat into the spout U, (attached to the bottom of the spout Q,) which conveys it to the stones or elevators.

L, is an opening in the bottom of the drum E surrounding the shaft T.

M, is an opening in the top of the fan drum F, surrounding the shaft.

V, V, are slides for opening or closing in the aperture M, in the top of the fan drum F.

I sometimes arm the face of the beating wings A, A, with sharp points or teeth—as shown in Fig. 4—or combine the saws and teeth upon the same wing; or I arm part of the beating wings with teeth and the remainder with saws, overlapping each other, with their saw edges gradually approaching nearer to each other from the outer to the inner ends of the beating wings.

Having thus fully described the construction and operation of my machine for cleaning wheat, I would observe that I do not claim the use of the beating wings with roughened surfaces for cleaning wheat of smut, garlic, &c.; but

What I do claim as my invention and desire to secure by Letters Patent, is—

The giving the face of the beating wings A, A, of my improved smut machine, a rough and sharp cutting surface by covering them with a series of saws b, b, overlapping each other, and arranged substantially in the manner herein set forth.

HENRY STAUB.

Witnesses:
HARRISON N. FABLE,
J. R. JANNEY.